Patented June 26, 1951

2,558,064

UNITED STATES PATENT OFFICE 2,558,064

METHOD OF PREPARING PARCHMENTIZED PAPER DIALYTIC MEMBRANES

William R. Steele, Camillus, and Russel H. Sawens, Syracuse, N. Y., assignors to Allied Chemical & Dye Corporation, a corporation of New York No Drawing. Application August 14, 1947, Serial No. 768,704

5 Claims. (Cl. 8—119)

This invention relates to the dialysis of alkali-metal hydroxide solutions, and is particularly concerned with improvements in the preparation of dialytic membranes for use in such processes.

For many years, purification of alkali-metal hydroxide solutions, such as the 17% NaOH liquors used in the viscose rayon industry, has been accomplished by dialysis. Several forms of dialytic apparatus have been employed, broadly classified as "tank" types and "filter-press" types. In recent years there has come into popular favor a "filter-press" type such as illustrated in United States Patent No. 2,399,471 of F. K. Daniel and J. L. Hutchings. It has advantages of compactness and operating simplicity which render it a highly desirable form. In the past, however, this form of apparatus has been limited in its commercial application to solutions containing relatively low concentrations of alkali-metal hydroxide. Thus, the maximum concentration which it has handled commercially is in the neighborhood of 17% NaOH at the crude inlet of the apparatus.

For handling more concentrated caustic solutions the tank or immersion type of apparatus described in United States Patent No. 2,124,861 of A. W. Saddington and A. P. Julien was devised. The principles upon which this apparatus is based are set forth in detail in this patent and in United States Patent No. 2,138,357 of the same inventors. This apparatus was initially designed for handling crude caustic soda liquors of 48% to 50% NaOH content, but it has been found highly satisfactory in handling lower concentrations and has been used extensively in the mercerizing industry for the purification of used mercerizing liquors of between 30% and 40% NaOH concentration. While the tank type of apparatus is more complex and involves more labor for operation than the "filter-press" type, it has, nevertheless, been used in the mercerizing liquor field to the exclusion of the latter type because of the difficulties encountered in attempts to apply the latter type to purification of these highly concentrated caustic solutions.

In both the filter-press type of apparatus of the Daniel and Hutchings patent and the tank type of apparatus of the Saddington and Julien patents the dialytic membranes in common use are composed of parchment paper prepared from ordinary sulfite or sulfate pulp paper made on a Fourdrinier machine by passing the paper rapidly through aqueous 70% $H_2SO_4$ solution at room temperature. The rate of travel is normally between 55 and 420 yards per minute, the higher rate being employed for light weight lightly parchmentized products and the lower rates for heavy fully parchmentized products. The treated paper is sprayed successively with dilute acid and plain water to remove the sulfuric acid and is then dried.

The primary difficulty in use of the "filter-press" type of equipment for dialysis of concentrated alkali-metal hydroxides has been the rupture of dialytic membranes. A group of tests of apparatus of the type illustrated in United States Patent No. 2,399,471 for purifying sodium hydroxide solutions of approximately 38% concentration will illustrate the seriousness of this difficulty. The membranes were composed of 110 lb. commercial parchment paper sheets with an exposed area 18 inches wide by 58 inches high. The dialytic membranes were first wet with water, then placed in the dialyzer and permitted to soak in 20% to 37½% sodium hydroxide solution for 12 hours to prepare the sheets for dialysis. In dialysis using deaerated water the papers failed in periods of one to ten days. These results are characteristic of the application of this type of equipment to more concentrated caustic solutions and contrast with the life of 30 to 50 days reported in United States Patent No. 2,138,357.

The early rupture of diaphragms in the "filter-press" type of dialyzer is probably due, in part at least, to two inherent characteristics of this type of equipment; first, it has no provision for preventing excessive internal temperatures; second, it employs a relatively tall dialyzer frame (substantially more than the two-foot height commonly employed in the tank type) to provide adequate capacity and reasonable compactness. As a result of the first of these characteristics membranes are subjected to the destructive effects of any local high temperatures; as a result of the second, they are subjected to relatively severe tension stresses. In the dialysis of mercerizing liquors the extremes of temperatures encountered in the dialysis of more concentrated solutions do not ordinarily occur but local temperatures may be sufficiently high to cause substantial deterioration nevertheless.

It is an object of the present invention to provide a method for improving the life of dialytic membranes in dialysis of concentrated alkali-metal hydroxide solutions. A further object is the provision of a simple pretreatment of parchment paper dialyzing membranes which renders them not only more suitable for efficient utilization in apparatus of the tank type, such as that of United States Patent No. 2,124,861, but also permits their satisfactory use in apparatus of the "filter-press" type such as illustrated in United States Patent No. 2,399,471. Our invention, therefore, has as a further object the adaptation of this latter type of apparatus to the purification of concentrated alkali-metal hydroxide solutions such as mercerizing liquors and similar solutions.

In accordance with the present invention, parchmentized paper is prepared for dialysis of concentrated alkali solutions by soaking the untensed paper in alkali-metal hydroxide solution having a concentration between 15% and 50% until substantial shrinkage of the paper has taken place in the machine direction. Employing 25% NaOH or KOH with 60 lb. parchment, noticeable shrinkage starts in about two minutes and progresses rapidly for the next 30 to 45 seconds. Subsequent shrinkage proceeds at a much slower rate.

Commercial sizes of "filter-press" type of dialyzer frames have a maximum (vertical) dimension greater than the width of commercially available parchmentized paper and the paper is normally placed in the dialyzers with the machine direction of the paper coincident with the longitudinal or maximum dimension of the dialyzer frames. In other words, the paper is placed so that the fibres which lay parallel to the direction of travel of the felt through the papermaking (Fourdrinier) machine are disposed vertically in the dialyzer, longitudinally in the frames. During dialysis of concentrated alkalies shrinkage of the parchment paper takes place in the machine direction whereas slight extension occurs at right angles to this direction. While the longitudinal tensing of the paper in the dialyzer does not ordinarily cause immediate failure, it apparently applies such stresses to the paper that the paper loses its resistance to the other deteriorating influences such as the attack of the caustic solution and high local temperatures. Paper pretreated in alkaline solution as described undergoes a simultaneous shrinkage in the machine direction and extension in the cross-machine direction, and may be used in dialytic apparatus involving rigid membrane supporting frames for long periods without rupture or other failure.

We have found that the dialytic life of parchment paper treated in untensed condition with an alkali-metal hydroxide solution may be still further improved by washing the treated paper with water to remove the alkali-metal hydroxide solution. When short alkali treatments are employed such as a 5-minute soak in 25% NaOH, the parchment after soaking may have a mottled appearance. However, this is removed by the rinsing treatment. The water-washing or rinsing performs the further service of rendering the paper less objectionable to handle and thus facilitates mounting the paper in the dialyzer frames.

Whether the caustic-treated paper is inserted directly into the dialyzer frames or whether it is first washed with water, it should be kept wet from the time of the caustic treatment until it is used for dialysis. If it is allowed to become dry before it is placed in the dialyzer, irregular shrinkage and deformity of the paper result.

The optimum pretreatment involves soaking the untensed parchment paper in 20% to 30% alkali-metal hydroxide solution (for between 1 and 24 hours (when NaOH is used) and between ½ and 24 hours when KOH is used) at temperatures between 20° C. and 40° C. and washing the yet wet paper with substantially plain water for at least ½ hour at a temperature between 10° C. and 60° C. While it is obviously convenient to pretreat with the same alkali-metal hydroxide as subsequently to be purified, for example, sodium hydroxide solution in the case of caustic soda mercerizing liquor or potassium hydroxide in the case of caustic potash mercerizing liquor, this is not essential so far as our invention is concerned and any of the alkali-metal hydroxides may be employed for treating membranes to be used in dialysis of any other alkali-metal hydroxide.

The dimensional and strength changes involved in the application of the invention are illustrated by the data in the following tables showing the results of treatments wherein 24-inch squares of 110 lbs. "Parchkin" (sulfuric-acid-parchmentized paper) were soaked in NaOH solutions for 6 hours at room temperature, then rinsed in cool fresh water for 2 hours.

TABLE I

*Before rinsing*

| Treatment | Paper Size, Inches | | Tensile Strength [1] | | Bursting Strength [2] |
|---|---|---|---|---|---|
| | Machine Direction | Cross Machine Direction | Machine Direction | Cross Machine Direction | |
| None (Dry) | 24 | 24 | 92 | 48 | 87 |
| 15% NaOH | 22⅜ | 26⅛ | 13 | 11 | 37 |
| 20% NaOH | 22⅜ | 25¾ | 12 | 13 | 39 |
| 23% NaOH | 22⅜ | 25½ | 14½ | 14 | 45 |
| 25% NaOH | 22⅜ | 25¼ | 18 | 17 | 47 |
| 30% NaOH | 22⅛ | 25⅛ | 23½ | 20½ | 53 |

TABLE II

*After rinsing*

| Treatment | Paper Size, Inches | | Tensile Strength [1] | | Bursting Strength [2] |
|---|---|---|---|---|---|
| | Machine Direction | Cross Machine Direction | Machine Direction | Cross Machine Direction | |
| 15% NaOH | 22⅜ | 25⅝ | 23 | 21 | 58 |
| 20% NaOH | 22¼ | 25⅝ | 24½ | 21 | 63 |
| 23% NaOH | 22⅛ | 25⅝ | 24½ | 23 | 61 |
| 25% NaOH | 22 | 25⅝ | 24 | 21 | 65 |
| 30% NaOH | 21¾ | 25⅝ | 24½ | 20 | 67 |

[1] Pounds per lineal inch.
[2] Bursting strength results are expressed in pounds per square inch. Details of this procedure are given in "TAPPI Standard and Official Testing Methods—Recommended Practices—Specifications of the Technical Association of the Pulp and Paper Industry," Method T403m44.

The treatments with 25% and 30% NaOH gave less reduction of tensile strength (Scott test) and bursting strength (Mullen test) and less extension in the cross-machine direction than more dilute solutions; the rinsing step, however, improved the sheets treated with dilute NaOH solution more than it improved the sheets treated with 25% and 30% NaOH so that the ultimate deviation in quality was relatively small.

Similar comparisons employing 25% NaOH at room temperature showed that with this NaOH concentration a major portion of the change takes place in the first 2 to 3 minutes, and after one hour very little change occurs within 24 hours. Thus under these conditions soaking periods from 1 to 24 hours are essentially equivalent.

Rinsing periods from ½ hour to 2 hours at 13° C. gave about equally satisfactory results. Rinsing at 49° C. resulted in a slightly greater shrinkage in the machine direction and slightly greater tensile strength.

The following table shows shrinkage and strength data for a 60 lb. parchment employing 25% NaOH solution. Paper dimensional changes are expressed on a 24 x 24 inch basis to facilitate comparison with the previous tables.

TABLE III

| Treatment | Paper Size, Inches | | Bursting Strength |
|---|---|---|---|
| | Machine Direction | Cross Machine Direction | |
| None (Dry) | 24 | 24 | |
| 5 Minute Soak | 22¹³⁄₁₆ | 24¹⁵⁄₁₆ | 27 |
| Tensile Strength | 9 | 7 | |
| 30 Minute Rinse | 22¹⁄₃₂ | 24¹⁵⁄₁₆ | |
| 15 Minute Soak | 22¹⁄₃₂ | 25½ | 26 |
| Tensile Strength | 9 | 7 | |
| 30 Minute Rinse | 22³⁄₆₄ | 25¹⁄₁₆ | |
| 4 Hour Soak | 22³⁄₆₄ | 25¹⁄₁₆ | 30 |
| 30 Minute Rinse | 22¹⁄₁₆ | 24¹⁵⁄₁₆ | |
| Tensile Strength | 10 | 8 | |

The following table shows shrinkage and strength data for a 60 lb. parchment employing 25% KOH solution. Paper dimensional changes are expressed on a 24 x 24 inch basis to facilitate comparison.

TABLE IV

| Treatment | Paper Size, Inches | | Bursting Strength |
|---|---|---|---|
| | Machine Direction | Cross Machine Direction | |
| None (Dry) | 24 | 24 | |
| 5 Minute Soak | 22¹⁵⁄₁₆ | 25⅜ | |
| 30 Minute Rinse | 22²¹⁄₃₂ | 24¾ | 32 |
| Tensile Strength | 15 | 11 | |
| 15 Minute Soak | 22¹³⁄₁₆ | 25⅜ | |
| 30 Minute Rinse | 22¹³⁄₁₆ | 24¾ | 31 |
| Tensile Strength | 14 | 12 | |
| 4 Hour Soak | 22²¹⁄₃₂ | 25½ | |
| 30 Minute Rinse | 22½ | 24¹⁵⁄₁₆ | 31 |
| Tensile Strength | 13 | 11 | |

The data of Tables III and IV indicate somewhat superior results are obtainable with 25% KOH as compared to 25% NaOH for corresponding treatment periods.

The following examples illustrate the application of our invention:

EXAMPLE 1

Parchment paper (110 lb. "Parchkin" (sulfuric-acid-parchmentized paper), Patterson Parchment Company) was soaked in 25% NaOH solution at room temperature (20° C.) for 12 hours. The paper was removed from the solution and immediately placed in the frames of a "filter-press" type of dialyzer designed to provide compartments with dialytic membrane partitions 18 inches by 58 inches separating the liquids in adjacent compartments. The dialyzer was then employed for recovering pure 9% to 11% NaOH solution by countercurrent flow of deaerated water and used mercerizing caustic (containing 38.2% NaOH and about 1⅓% organic, chiefly cellulosic, impurities) through alternate compartments formed by the paper partitions. After 76 days of operation in this manner the dialyzer was opened and the membranes were inspected. Every membrane was found to be intact with no indication of imminent failure.

EXAMPLE 2

60 lb. sulfuric acid-parchmentized paper (Patterson Parchment Company) was soaked in 25% NaOH solution for 4 hours and was then removed and rinsed with water for 2 hours. This paper while still wet was used in the same dialyzer employed in Example 1 and a crude works liquor of 39% NaOH concentration was dialyzed in countercurrent dialytic relation with deaerated water to provide a 10% to 12% purified sodium hydroxide solution. After 74 days of operation no failure had occurred and again there was no indication of imminent failure of the dialytic membranes.

In both Example 1 and Example 2 the flow of crude sodium hydroxide solution was controlled to provide a crude effluent concentration of 3% to 5% NaOH.

We claim:

1. The method of treating sulfuric-acid-parchmentized paper dialytic membrane for dialysis of concentrated alkali-metal hydroxide solution in a dialyzer comprising rigid membrane supporting frames, which comprises soaking the said untensed parchmentized paper dialytic membrane in aqueous alkali-metal hydroxide solution of between 15% and 50% alkali-metal hydroxide concentration for at least 2 to 3 minutes and until substantial shrinkage has taken place in one direction and the shrinkage rate has passed a peak.

2. The method of claim 1, wherein the membrane is soaked in aqueous 20% to 30% alkali-metal hydroxide solution at 20° C. to 40° C. for at least 3 minutes and is maintained wet from the time of said soaking to the time of said dialysis.

3. The method of claim 2, wherein the soaked membrane is rinsed with water until substantially free from alkali-metal hydroxide and is maintained wet from the time of said soaking to the time of said dialysis.

4. The method of treating sulphuric-acid-parchmentized paper dialytic membrane for dialysis of used mercerizing liquor containing about 40% alkali-metal hydroxide and contaminated with cellulosic impurities, in a dialyzer comprising rigid membrane-supporting frames, which comprises soaking the said untensed parchmentized paper dialytic membrane in aqueous 20% to 30% NaOH solution for 1 to 24 hours at 20° C. to 40° C., rinsing the soaked parchment paper with substantially plain water for at least ½ hour, said rinsing being effected at a temperature between 10° C. and 60° C., and maintaining the parchment paper wet from the time of said soaking to the time of said dialysis.

5. The method of treating sulphuric-acid-parchmentized paper dialytic membrane for dialysis of used mercerizing liquor containing about 40% alkali-metal hydroxide and contaminated with cellulosic impurities, in a dialyzer comprising rigid membrane-supporting frames, which comprises soaking the said untensed parchmentized paper dialytic membrane in aqueous 20% to 30% KOH solution for ½ to 24 hours at 20° C. to 40° C., rinsing the soaked parchment paper with substantially plain water for at least ½ hour, said rinsing being effected at a temperature between 10° C. and 60° C., and maintaining the parchment paper wet from the time of said soaking to the time of said dialysis.

WILLIAM R. STEELE.
RUSSEL H. SAWENS.

REFERENCES CITED

The following references are of record in the file of this patent:

UNITED STATES PATENTS

| Number | Name | Date |
|---|---|---|
| 61,267 | Schmidt | Jan. 15, 1867 |
| 73,322 | Gwynn | Jan. 14, 1868 |
| 1,265,082 | Heberlein (1) | May 7, 1918 |
| 1,439,513 | Heberlein (2) | Dec. 19, 1922 |
| 1,546,211 | Dreyfus | July 14, 1925 |
| 1,757,755 | Hahn | May 6, 1930 |
| 1,815,761 | Gerini | July 21, 1931 |
| 2,015,132 | Young | Sept. 24, 1935 |
| 2,361,000 | Zender | Oct. 24, 1944 |

FOREIGN PATENTS

| Number | Country | Date |
|---|---|---|
| 4,323 | Great Britain | 1882 |